United States Patent
Marcus et al.

(10) Patent No.: US 8,700,398 B2
(45) Date of Patent: Apr. 15, 2014

(54) INTERFACE FOR SETTING CONFIDENCE THRESHOLDS FOR AUTOMATIC SPEECH RECOGNITION AND CALL STEERING APPLICATIONS

(75) Inventors: Jeffrey N. Marcus, Newton, MA (US); Amy E. Ulug, San Jose, CA (US); William Bridges Smith, Jr., Peterborough, NH (US)

(73) Assignee: Nuance Communications, Inc., Burlington, MA (US)

( * ) Notice: Subject to any disclaimer, the term of this patent is extended or adjusted under 35 U.S.C. 154(b) by 360 days.

(21) Appl. No.: 13/305,956

(22) Filed: Nov. 29, 2011

(65) Prior Publication Data
US 2013/0138439 A1    May 30, 2013

(51) Int. Cl.
  G10L 15/00    (2013.01)
(52) U.S. Cl.
  USPC ........... 704/240; 704/233; 704/236; 704/251; 704/252; 704/270; 704/9; 707/769; 715/731; 715/804
(58) Field of Classification Search
  CPC ......... G10L 15/08; G10L 15/20; G10L 15/22; G10L 15/24; G10L 15/10; G06F 17/30867; G06F 2203/04803
  USPC ............ 704/233, 236, 240, 251, 252, 270, 9; 707/769; 715/731, 804
  See application file for complete search history.

(56) References Cited

U.S. PATENT DOCUMENTS

| | | | |
|---|---|---|---|
| 7,774,202 B2* | 8/2010 | Spengler et al. | 704/236 |
| 8,000,962 B2* | 8/2011 | Doyle et al. | 704/240 |
| 8,374,869 B2* | 2/2013 | Kang et al. | 704/251 |
| 2004/0049375 A1* | 3/2004 | Brittan et al. | 704/9 |
| 2005/0080627 A1* | 4/2005 | Hennebert et al. | 704/270 |
| 2005/0182628 A1* | 8/2005 | Choi | 704/252 |
| 2006/0074651 A1* | 4/2006 | Arun | 704/233 |
| 2008/0115082 A1* | 5/2008 | Simmons et al. | 715/804 |
| 2008/0281596 A1 | 11/2008 | Kim et al. | 704/251 |

(Continued)

OTHER PUBLICATIONS

Sankar, et al, "Automatic Confidence Score Mapping for Adapted Speech Recognition Systems", *2002 Conference on Acoustics, Speech and Signal Processing Proceedings* (ICASSP); Orlando, FL May 13-17, 2002; IEEE International Conference on Acoustics, Speech and Signal Processing (ICASSP), New York, NY; IEEE, US, vol. 1, May 13, 2002, pp. I-216, XP010804732, ISBN: 978-0-7803-7402-7.

(Continued)

*Primary Examiner* — Michael Colucci
(74) *Attorney, Agent, or Firm* — Sunstein Kann Murphy & Timbers LLP

(57) ABSTRACT

An interactive user interface is described for setting confidence score thresholds in a language processing system. There is a display of a first system confidence score curve characterizing system recognition performance associated with a high confidence threshold, a first user control for adjusting the high confidence threshold and an associated visual display highlighting a point on the first system confidence score curve representing the selected high confidence threshold, a display of a second system confidence score curve characterizing system recognition performance associated with a low confidence threshold, and a second user control for adjusting the low confidence threshold and an associated visual display highlighting a point on the second system confidence score curve representing the selected low confidence threshold. The operation of the second user control is constrained to require that the low confidence threshold must be less than or equal to the high confidence threshold.

21 Claims, 5 Drawing Sheets

(56) References Cited

U.S. PATENT DOCUMENTS

| | | | |
|---|---|---|---|
| 2009/0259466 A1* | 10/2009 | Stubley et al. | 704/240 |
| 2010/0306249 A1* | 12/2010 | Hill et al. | 707/769 |
| 2011/0184735 A1* | 7/2011 | Flaks et al. | 704/240 |
| 2011/0239119 A1* | 9/2011 | Phillips et al. | 715/731 |
| 2013/0030803 A1* | 1/2013 | Liao | 704/233 |

OTHER PUBLICATIONS

European Patent Office, Officer Ervin Dobler, International Search Report and Written Opinion, PCT/US2011/020495, date of mailing Mar. 24, 2011, 12 pages.

* cited by examiner

INTERFACE FOR SETTING CONFIDENCE THRESHOLDS FOR AUTOMATIC SPEECH RECOGNITION AND CALL STEERING APPLICATIONS

FIELD OF THE INVENTION

The present invention relates to language processing applications, and more specifically to confidence scoring functionality in speech recognition systems.

BACKGROUND ART

Natural language systems try to determine the semantic meaning of a text input such as a text sequence output from automatic speech recognition (ASR). One common natural language application is an automated dialog system (call steering) in which the system prompts a user to provide a speech input indicating what action to take next. A speech recognition component analyzes the resulting speech input to try to determine its semantic meaning. Typically, statistical speech models are used to determine a sequence of words that best corresponds to the speech input.

Using the specific example of a call steering application, the system is evaluated from a test set of utterances which are then annotated with:
1) Caller intent: One of a finite set of intents assigned to the caller's utterance by a human expert. For example, in a technical support application, "my printer is not working, I need help" might be assigned to the intent "PRINTER PROBLEM". Note that in some cases the caller's intent actually may be out-of-domain meaning that it doesn't match any of the finite set available.
2) Semantic interpretation: The interpretation that is automatically determined by the system. This interpretation typically may be drawn from the same set of intents as are the caller intents.
3) Correctness: An utterance is deemed correct if the caller's intent is identical to the semantic interpretation.
4) Confidence score: The confidence the system has in the interpretation: a number between 0 and 100.

Looking more closely at the idea of confidence scores, these can be used to characterize the degree of correspondence between a given word sequence and a speech input. FIG. 1 shows a scale of confidence scores along a vertical axis ranging from a high of 1000 to a low of 0. Typically, speech recognition outputs having a confidence score above a given high confidence threshold are automatically accepted as probably correctly recognized. And speech recognition outputs having a confidence score below another given low confidence threshold are automatically rejected as probably not correctly recognized. Speech recognition outputs between the two confidence score thresholds may or may not be correctly recognized and usually require some form of user confirmation.

Various system performance measurements can be used to set the confidence score thresholds. Inputs above the higher threshold which are automatically accepted contribute to a Correct Accepted (CA) rate when the identification is correct, and to a False Accepted (FA) rate when incorrect. Similarly, inputs below the lower threshold which are automatically rejected contribute to a Correct Rejected (CR) rate when the rejection is correct (i.e., the speech input is out of the recognition vocabulary), and to a False Rejected (FR) rate when the rejection is incorrect (i.e., the speech input is within the recognition vocabulary, but not correctly recognized). Inputs between the two thresholds which require user confirmation contribute to Correct Confirmed (CC) and False Confirmed (FC) rates.

Ideally, the CA and CR rates should be as high as possible, while the FA and FR rates should be as low as possible, and at the same time, user confirmation, CC and FC should be required as seldom as possible. In practice, this requires compromise and balancing of competing factors by a speech recognition engineer. Typically, various operating point criteria are established such as some x % FA, y % FC, z % CA, etc. Then system performance data is collected for one or more test sets. This requires that some recognition correctness criteria be established. Recognition of the test set is then performed with the final recognition grammar package and each recognition result is labeled as correct or incorrect. From these results, a Receiver Operating Characteristic (ROC) curve can be determined (FA versus CA). The defined system operating points are located on the ROC curve which are used to then set the corresponding confidence score thresholds. FIG. 2 shows one specific example of a typical Receiver Operating Characteristic (ROC) curve to set confidence score thresholds.

SUMMARY OF THE INVENTION

Embodiments of the present invention are directed systems and methods for an interactive user interface for setting confidence score thresholds in a language processing system. There is a display of a first system confidence score curve characterizing system recognition performance associated with a high confidence threshold, a first user control for adjusting the high confidence threshold and an associated visual display highlighting a point on the first system confidence score curve representing the selected high confidence threshold, a display of a second system confidence score curve characterizing system recognition performance associated with a low confidence threshold, and a second user control for adjusting the low confidence threshold and an associated visual display highlighting a point on the second system confidence score curve representing the selected low confidence threshold. The operation of the second user control is constrained to require that the low confidence threshold must be less than or equal to the high confidence threshold.

At least one of the confidence score curve displays may include a displayed indication of at least one of a current system operating point and a recommended operating point on the curve, and/or a display of an automatically generated suggested threshold value for the curve, and/or a display of a graphical representation of the confidence score value associated with the selected position of the user control for the curve. At least one of the user controls may be a user adjustable slider control.

Some specific embodiments may further include a display of a graphical representation of a plurality of confidence threshold-dependent system operating statistics, for example, statistics for current threshold settings, recommended threshold settings, and/or selected threshold settings. There also may be a user selectable input control for applying the user adjusted high and low confidence thresholds for operation in the system. The confidence thresholds may be for acoustic confidence scores reflecting reliability that a correct recognition of a current system input has been determined, and/or semantic confidence scores reflecting reliability that a correct meaning of a current system input has been determined.

Embodiments of the present invention also include a computer program product implemented in a computer readable storage medium for setting confidence score thresholds in a language processing system according to any of the above.

DETAILED DESCRIPTION OF SPECIFIC EMBODIMENTS

For non-speech engineers, choosing appropriate confidence score thresholds for an application is a difficult task; there is little guidance available and often no good method of visualization—tables of numbers are often used. This is particularly problematic when more than one threshold is being set since the number of possible combinations quickly becomes overwhelming. Embodiments of the present invention address several aspects of this problem: (a) providing the user with a recommended confidence score threshold setting based on some optimization criteria, (b) providing to the user a visualization of the effect of his choices compared to other choices, and (c) providing an interactive method for choosing an optimal threshold.

Confidence thresholds can be measured in various ways. Typically in speech recognition systems, confidence thresholds based on "acoustic confidence" is used which expresses the confidence that given an utterance's acoustics, the word or sequence of words that were recognized correctly. There also can be a "semantic confidence" which expresses the confidence that given the phrase recognized by the recognizer is what the caller actually meant.

Figure 1:
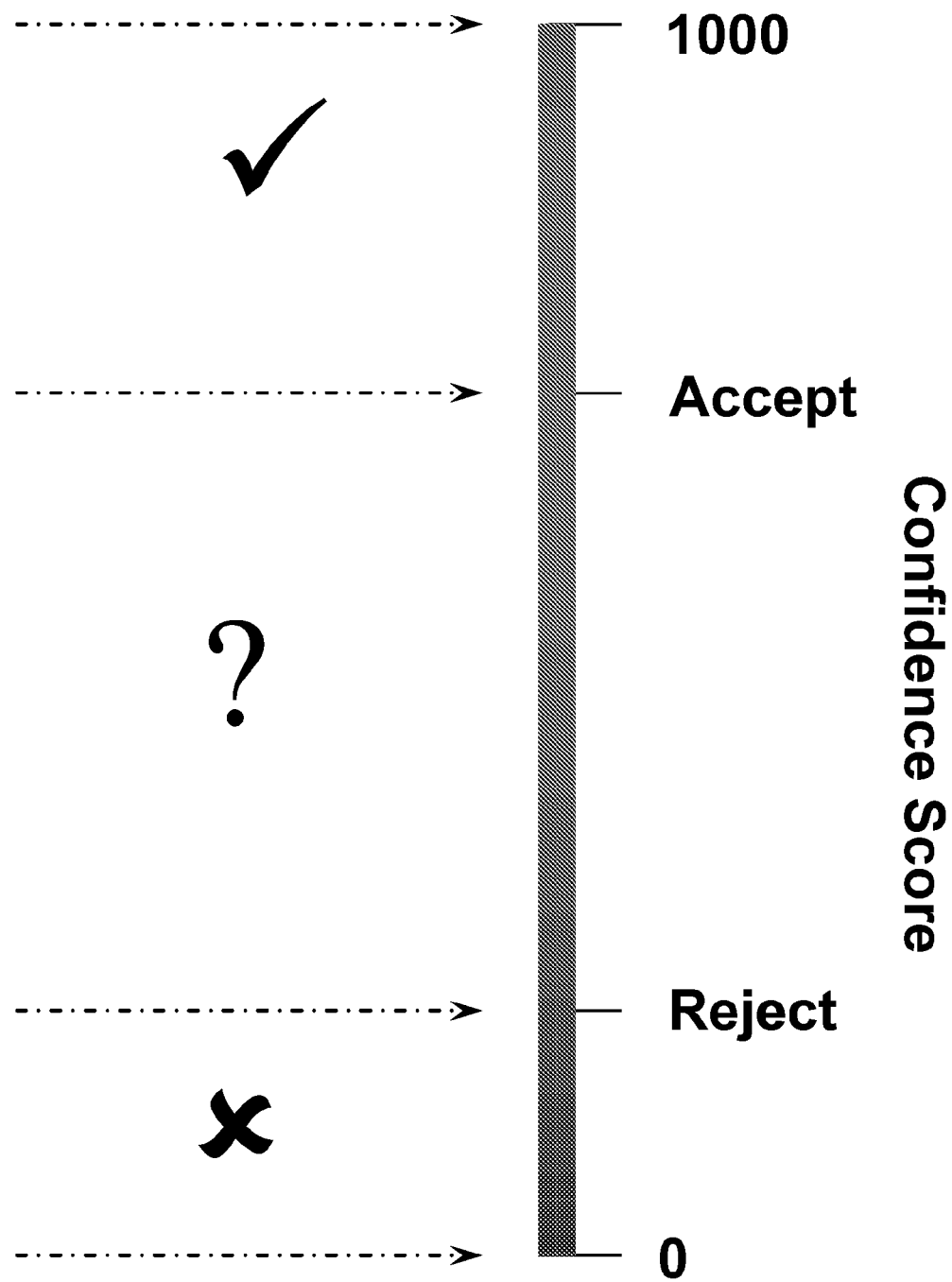
FIG. 1 shows a typical confidence score scale arrangement for use in a speech recognition engine.
Figure 2:
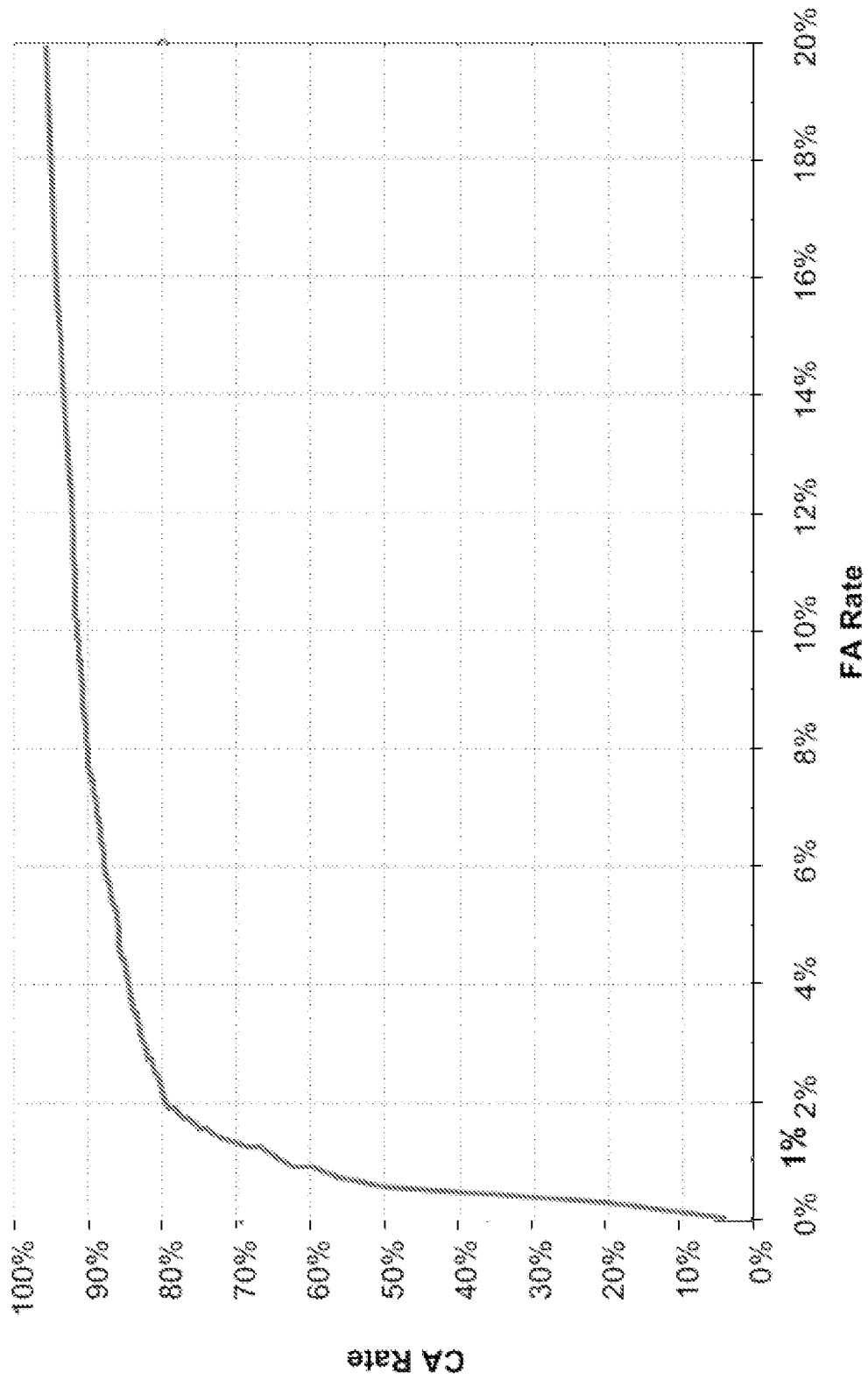
FIG. 2 shows an example a typical Receiver Operating Characteristic (ROC) curve for adjusting confidence scoring.
Figure 3:
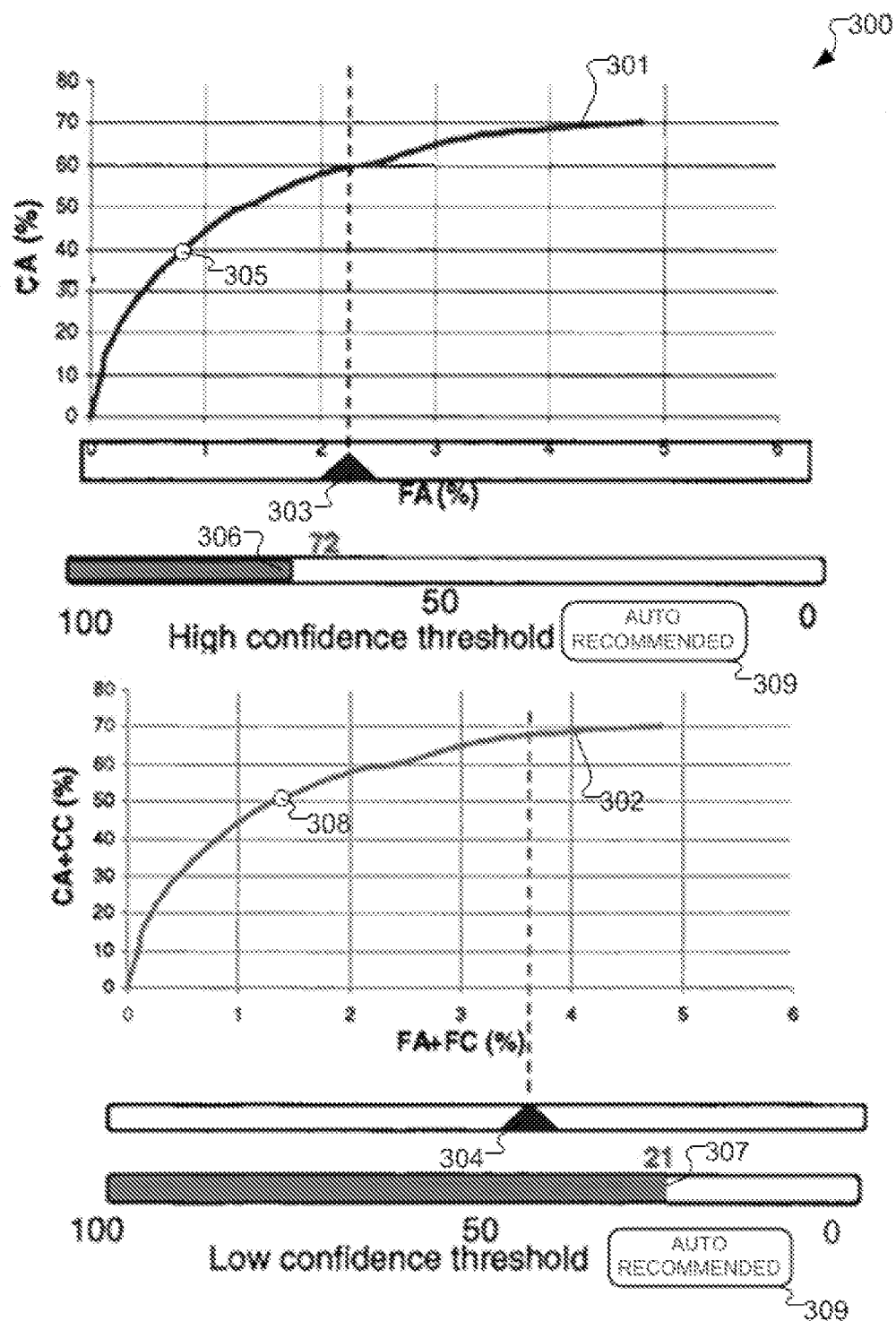
FIG. 3 shows an example of an interactive user interface for setting confidence score thresholds according to one specific embodiment of the present invention.

FIG. 3 shows an example of an interactive user interface for setting confidence score thresholds according to one specific embodiment of the present invention. An interactive user interface 300 is provided for setting confidence score thresholds in a language processing system. The top half of the user interface 300 provides a display of a high confidence score curve 301 that characterizes a high confidence threshold above which user speech inputs are automatically accepted. The vertical axis is the CA rate and the horizontal axis is the FA rate. A high threshold slider 303 user control input allows a system user to adjust the high confidence threshold. The interactive user interface 300 also may provide an associated visual display such as the vertical dashed line in FIG. 3 that highlights the point on the high confidence score curve 301 that corresponds to the user selected high confidence threshold. The current system high confidence threshold operating point 305 also is displayed on the high confidence score curve 301, and a thermometer bar 306 graphical representation of the confidence score value associated with the selected position of the high threshold slider 303 user control. An auto recommend button 309 can also be selected by the user to produce a display of an automatically generated suggested threshold value for the high confidence score curve 301.

The bottom half of the user interface 300 provides a display of a low confidence score curve 302 that characterizes a low confidence threshold below which user speech inputs are automatically rejected. A low threshold slider 304 user control input allows a system user to adjust the low confidence threshold. The operation of the low threshold slider 304 user control is constrained to require that the low confidence threshold must be less than or equal to the high confidence threshold. The bottom half of the interactive user interface 300 is like the top half in also providing a vertical dashed line that highlights the point on the low confidence score curve 302 that corresponds to the user selected low confidence threshold, the current system low confidence threshold operating point 308, a thermometer bar 306 graphical representation of the confidence score value associated with the selected position of the low threshold slider 304 user control, and an auto recommend button 309 that be selected by the user to produce a display of an automatically generated suggested threshold value for the low confidence score curve 302.

Figure 4:
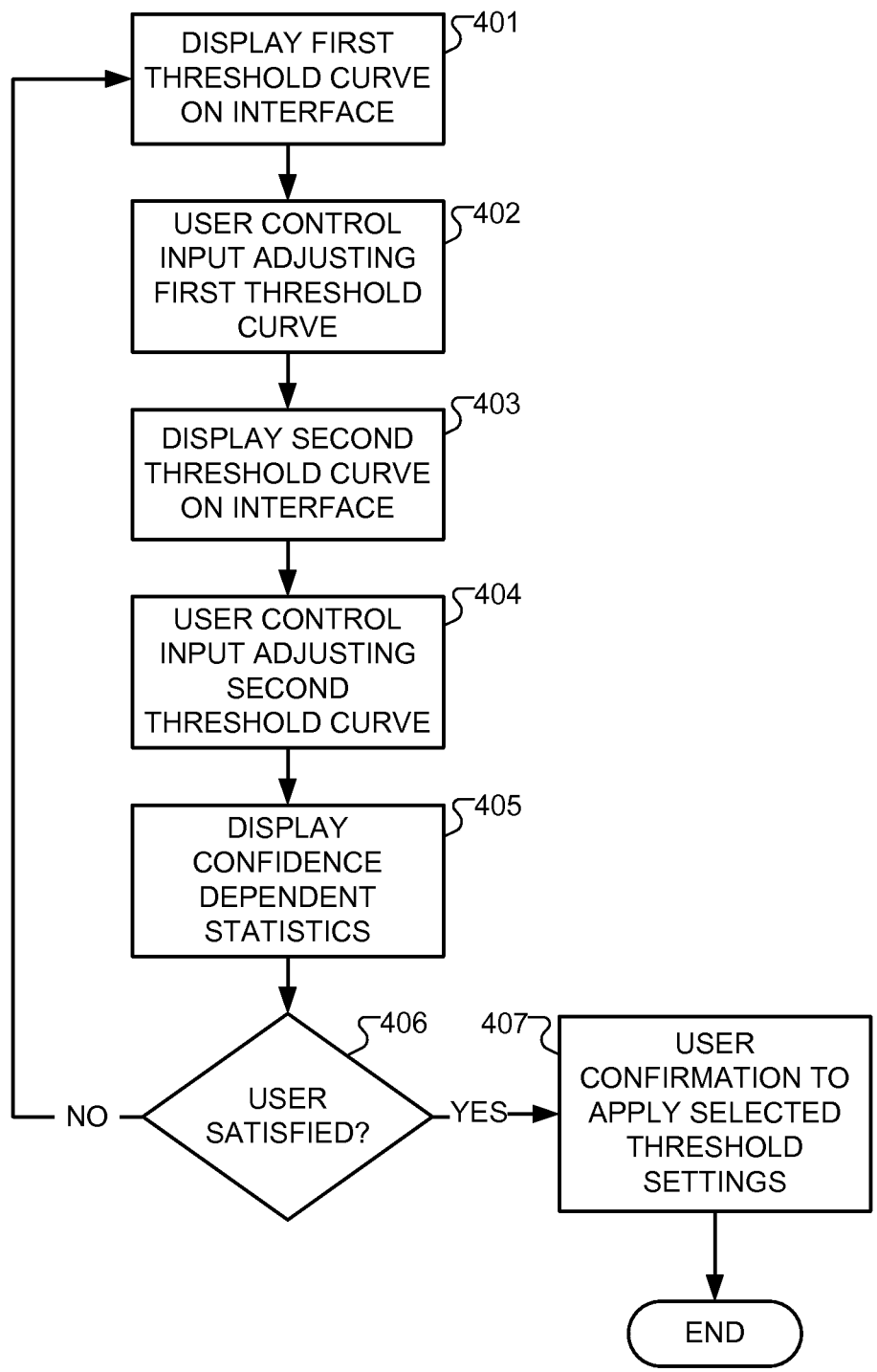
FIG. 4 shows various logical steps in a method according to an embodiment.

FIG. 4 shows various logical steps in a method according to one embodiment for using an interactive user interface to set confidence score thresholds. To set the high confidence threshold, the interface displays the high confidence score curve, step 401. The user views the high confidence score curve and selects a high confidence threshold operating point along the x (FA) axis using the high threshold slider, step 402. The interface also displays on the thermometer bar the high confidence threshold associated with that point. The low confidence threshold is then set starting with the interface display of the low confidence score curve, step 403. The user then selects a low confidence threshold operating point on the low confidence score curve by moving the low threshold slider control along the x (FA+FC) axis, step 404. The low threshold slider selection is restricted so that FA+FC≥FA (as selected in step 402). This is equivalent to restricting the low confidence threshold to be lower than the high confidence threshold, and also restricts CA+CC≥CA.

To aid the user with setting the confidence thresholds, the system may usefully display various recognition accuracy statistics, step 405 that may vary as a result of the user's threshold selections. For each confidence score curve, the user control slider may initially be set at some automatically recommended value. In addition or alternatively, if the user previously has saved settings for another configuration with a particular set of confidence score thresholds, the operating point for those thresholds may be shown as well so that the user can compare current, recommended, and user selected confidence score thresholds.

Figure 5:
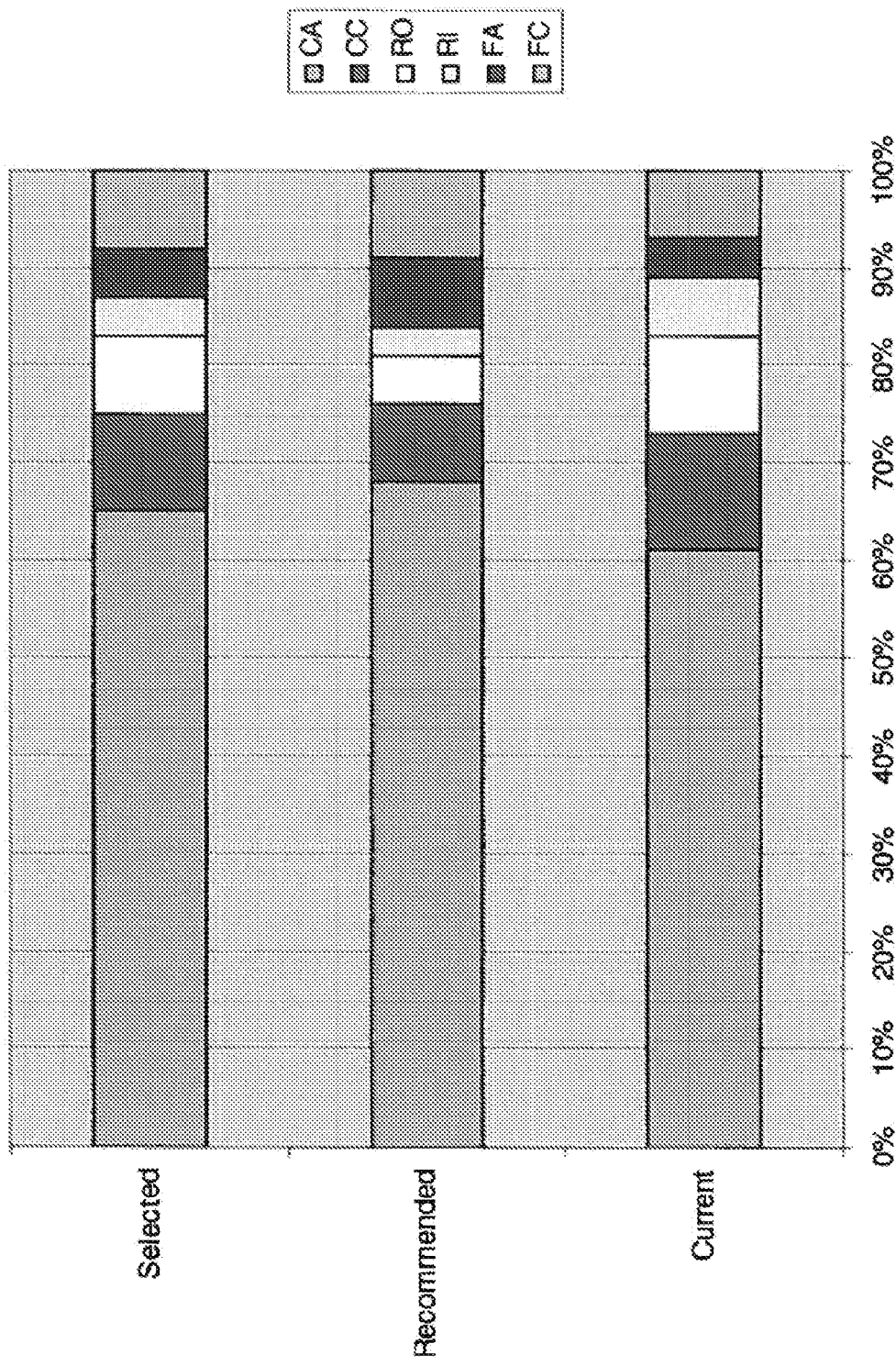
FIG. 5 shows a user display of confidence-dependent statistics according to an embodiment.

FIG. 5 shows one specific example a user display of threshold-dependent statistics to the user in a stacked bar chart graphical form in real time as he adjusts the thresholds. In FIG. 5, the following abbreviations are used:

CA: Correct acceptance rate: percentage of utterances that were interpreted correctly (I.e, the caller's intent meaning with confidence at or above high confidence threshold)

FA: False acceptance rate: percentage of utterances interpreted incorrectly with confidence at or above high confidence threshold CC: Correct confirm rate: percentage of utterances that were interpreted correctly with confidence at or above low confidence threshold and below the high confidence threshold.

FC: False confirm rate: percentage of utterances that were interpreted incorrectly with confidence at or above low confidence threshold and below the high confidence threshold RO: Percentage of utterances that are out-of-domain and have confidence scores below the low confidence threshold RI: Percentage of utterances that are in-domain utterances and have confidence scores below the low confidence threshold.

The statistics display in FIG. 5 shows statistics for the current thresholds in a bar across the bottom. These are the thresholds (if any) that the user had set in the past and/or previously were used in the application. The center horizontal bar shows statistics for the automatically recommended thresholds suggested by the system. The upper bar shows statistics for the selected thresholds as adjusted by the slider controls. Other embodiments may also display other statistics, including without limitation:

CA+CC: Sum of CA and CC; percentage of utterances that were interpreted correctly with confidence at or above low confidence threshold FA+FC: Sum of FA and FC; percentage of utterances that were interpreted incorrectly with confidence at or above low confidence threshold Once the user is satisfied with some given threshold selection, they can push an interface button to "Use these thresholds," and the system may then record their selected choices in an application configuration file that can be used in a deployed application.

Compared to pre-existing confidence score setting arrangements, embodiments of the present invention may differ in one or more of the following ways:

The user can directly select a confidence score threshold operating point on the FA/CA (upper confidence score) and FA+FC/CA+CC (lower confidence score) curves and the confidence score thresholds are determined from that rather than having a user directly set an operating threshold.

The challenge of selecting two confidence score thresholds is decomposed into two distinct phases, which is simpler than supporting simultaneous setting of both thresholds.

The system displays a recommended threshold setting to the user, which may reflect an experience based formula to optimize system performance.

The user gets immediate feedback on the impact of their proposed selection both on absolute performance statistics and on performance statistics relative to the recommended value.

The system directly stores the user's threshold's selection into a configuration file for the deployed application, simplifying creation of this file and reducing the chance of an error when copying to the file.

As discussed above, optimal setting of confidence score thresholds arises specifically in call steering applications and more generally in enterprise speech recognition applications. Thus, embodiments of the present invention may be used in these general applications as well. For example, embodiments may enable application developers to set semantic confidence thresholds in text-only applications such as instant messaging.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components. For example, a pseudo code representation of such a process might be set forth as follows:

```
Process ConfidenceScoreInterface
    display (upper_cs_curve)
    adjust (upper_cs_threshold)
    select (upper_cs_threshold)
    record (upper_cs_threshold)
    display (lower_cs_curve)
    adjust (lower_cs_threshold)
    select (lower_cs_threshold)
    record (lower_cs_threshold)
    ; lower_cs_threshold ≤ upper_cs_threshold
```

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method for setting confidence score thresholds in a language processing system, the method comprising:

displaying on a user interface a first system confidence score curve characterizing system recognition performance associated with a high confidence threshold;

providing on the user interface a first user control for adjusting the high confidence threshold and an associated visual display highlighting a point on the first system confidence score curve representing the selected high confidence threshold;

displaying on the user interface a second system confidence score curve characterizing system recognition performance associated with a low confidence threshold; and providing on the user interface a second user control for adjusting the low confidence threshold and an associated visual display highlighting a point on the second system confidence score curve representing the selected low confidence threshold;

wherein the operation of the second user control is constrained to require that the low confidence threshold must be less than or equal to the high confidence threshold.

2. A method according to claim 1, wherein displaying a system confidence score curve includes displaying an indication of at least one of a current system operating point and a recommended operating point on the curve.

3. A method according to claim 1, further comprising:
displaying a graphical representation of a plurality of confidence threshold-dependent system operating statistics.

4. A method according to claim 3, wherein the displayed operating statistics include statistics for current threshold settings and selected threshold settings.

5. A method according to claim 1, further comprising:
providing a user selectable input control for applying the user adjusted high and low confidence thresholds for operation in the system.

6. A method according to claim 1, wherein the confidence thresholds are for acoustic confidence scores reflecting reliability that a correct recognition of a current system input has been determined.

7. A method according to claim 1, wherein the confidence thresholds are for semantic confidence scores reflecting reliability that a correct meaning of a current system input has been determined.

8. An interactive user interface for setting confidence score thresholds in a language processing system, the interface comprising:
a display of a first system confidence score curve characterizing system recognition performance associated with a high confidence threshold;
a first user control for adjusting the high confidence threshold and an associated visual display highlighting a point on the first system confidence score curve representing the selected high confidence threshold;
a display of a second system confidence score curve characterizing system recognition performance associated with a low confidence threshold; and
a second user control for adjusting the low confidence threshold and an associated visual display highlighting a point on the second system confidence score curve representing the selected low confidence threshold, wherein the operation of the second user control is constrained to require that the low confidence threshold must be less than or equal to the high confidence threshold.

9. A system according to claim 8, wherein at least one of the confidence score curve displays includes a displayed indication of at least one of a current system operating point and a recommended operating point on the curve.

10. A system according to claim 8, further comprising:
a display of a graphical representation of a plurality of confidence threshold-dependent system operating statistics.

11. A system according to claim 10, wherein the displayed operating statistics include statistics for current threshold settings and selected threshold settings.

12. A system according to claim 8, further comprising:
a user selectable input control for applying the user adjusted high and low confidence thresholds for operation in the system.

13. A system according to claim 8, wherein the confidence thresholds are for acoustic confidence scores reflecting reliability that a correct recognition of a current system input has been determined.

14. A system according to claim 8, wherein the confidence thresholds are for semantic confidence scores reflecting reliability that a correct meaning of a current system input has been determined.

15. A computer program product implemented in a computer readable storage medium for setting confidence score thresholds in a language processing system, the program product comprising:
program code for displaying on a user interface a first system confidence score curve characterizing system recognition performance associated with a high confidence threshold;
program code for providing on the user interface a first user control for adjusting the high confidence threshold and an associated visual display highlighting a point on the first system confidence score curve representing the selected high confidence threshold;
program code for displaying on the user interface a second system confidence score curve characterizing system recognition performance associated with a low confidence threshold; and
program code for providing on the user interface a second user control for adjusting the low confidence threshold and an associated visual display highlighting a point on the second system confidence score curve representing the selected low confidence threshold, wherein the operation of the second user control is constrained to require that the low confidence threshold must be less than or equal to the high confidence threshold.

16. A product according to claim 15, wherein the program code for displaying a system confidence score curve includes program code for displaying an indication of at least one of a current system operating point and a recommended operating point on the curve.

17. A product according to claim 15, further comprising:
program code for displaying a graphical representation of a plurality of confidence threshold-dependent system operating statistics.

18. A product according to claim 17, wherein the displayed operating statistics include statistics for current threshold settings and selected threshold settings.

19. A product according to claim 15, further comprising:
program code for providing a user selectable input control for applying the user adjusted high and low confidence thresholds for operation in the system.

20. A product according to claim 15, wherein the confidence thresholds are for acoustic confidence scores reflecting reliability that a correct recognition of a current system input has been determined.

21. A product according to claim 15, wherein the confidence thresholds are for semantic confidence scores reflecting reliability that a correct meaning of a current system input has been determined.

* * * * *